Figure 1:
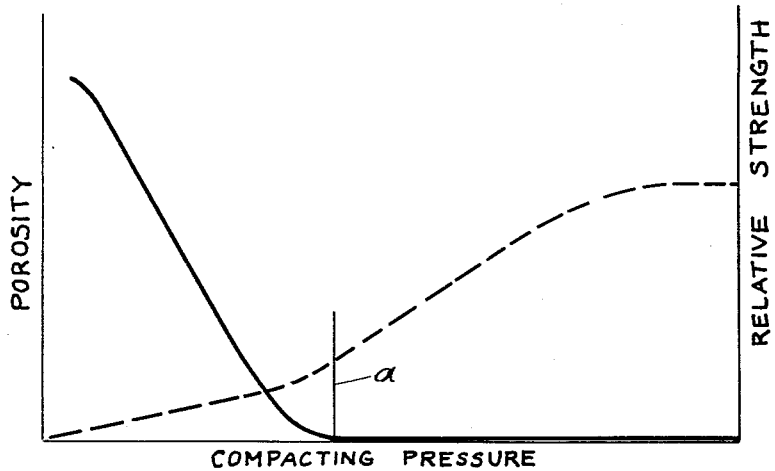

Feb. 27, 1962 W. J. DAVIS 3,022,542
POROUS POLYAMIDE ARTICLES AND PROCESS
FOR THE PRODUCTION THEREOF
Filed Aug. 5, 1958

INVENTOR
William J. Davis
BY
Synnestvedt & Lechner
ATTORNEYS

3,022,542
Patented Feb. 27, 1962

3,022,542
POROUS POLYAMIDE ARTICLES AND PROCESS FOR THE PRODUCTION THEREOF
William J. Davis, Wyomissing, Pa., assignor to The Polymer Corporation, Reading, Pa., a corporation of Pennsylvania
Filed Aug. 5, 1958, Ser. No. 753,337
8 Claims. (Cl. 18—55)

This invention relates to the formation of porous shaped articles from high melting synthetic linear polyamides, such as polyhexamethylene adipamide, polyhexamethylene sebacamide and polymerized epsilon aminocaproic acid (caprolactam), such high melting polyamides commonly being known as nylon. The invention is particularly concerned with articles of relatively high porosity, substantially higher than could be made by prior techniques.

In general, prior techniques for forming useful shapes from polyamides have been directed to the formation of dense and non-porous articles, chiefly because it was found that attempts to form porous articles resulted in shapes of such inferior strength as to be virtually useless.

However, there are a number of applications for which it is desirable to utilize a substantially porous polyamide article, especially where the application involves the pick-up of a liquid, the temporary retention of the liquid, and the subsequent release of the liquid by the polyamide article.

It is an important object of the invention to provide processes by which nylon materials can be formed into desired shapes of adequate strength and of a relatively high degree of porosity.

A further object of the invention is the provision of compositions from which articles can be formed and shaped articles which are characterized by a substantial degree of porosity.

Before describing the invention in detail, a number of illustrative examples of applications involving high porosity nylon articles will be briefly set forth.

It is customary in the printing field to utilize a roller to spread ink on the type face. I have found that such rollers formed of high porosity nylon according to my invention offer a number of striking advantages. The porous nylon material picks up, retains, and releases a wide variety of inks with great facility. In addition, porous nylon printing rollers are of sufficient strength to withstand the pressures involved and also exhibit outstanding wear resistance qualities.

An aspect of the printing applications of porous nylon rollers is involved in rollers for pressure imprinting devices of the kind commonly referred to as "Charga-plate" imprinters. Such imprinters use direct reading characters and the inking roll must give up ink only upon the application of an appreciable pressure. Porous nylon rollers made according to my invention have been found to be of special advantage in this type of imprinter.

Still further with respect to the printing industry, the invention contemplates the use of a porous printing plate having integral raised porous characters. Ink can then be fed through the porous material from the rear (the background between characters being masked out, to prevent the passage of ink therethrough, for example by means of a suitable coating).

Another field in which porous nylon articles are of considerable significance is the field of bearings. Porous nylon bearings have been found to pick up, retain and release the liquid lubricant in particularly advantageous fashion. I have also found that ball bearing races can be advantageously formed of porous nylon impregnated with liquid lubricant.

Filters are still another field of application of porous nylon, such filters being of special value in applications where the substance to be filtered is highly corrosive to ordinary filter elements. The inherent high resistance of the nylon materials to corrosion by many materials normally thought to be highly corrosive leads to special advantages in porous nylon filters.

With the foregoing uses of porous nylon materials in mind, attention is now turned to the processes and products of the invention.

The shaped articles of the invention are made by the general technique commonly referred to as "sintering." According to this technique a finely divided nylon powder is first prepared by dissolving the nylon in a solvent or swelling agent and then precipitating the nylon from the solution either by the addition of a chemical precipitator agent, or, when the solvent used is a solvent only at elevated temperature and is a non-solvent at room temperature, by cooling the solution. The nylon powder resulting from such a precipitation technique is exceptionally fine—considerably finer than any nylon powder which can at the present time be obtained by mechanical grinding, etc. The ultimate particle size of the precipitated powder nylon may be on the order of several microns. For the purposes of sintering articles, the powder should have an average ultimate particle size of less than 40 microns.

After the precipitated powder nylon is prepared, a green article is cold pressed from the powder, the pressing being carried out under a pressure sufficient to form a green article capable of being handled. In general, the pressing force required runs from about 5 or 10 tons per square inch up to about 25 tons per square inch.

After the cold pressing operation the green article is removed from the press and heated to an elevated temperature. When pure, unfilled nylon is being formed, the sintering temperature advantageously runs from about a few degrees below the melting point down to about 25 to 50° below the melting point of the polyamide. When large proportions of a filler material are used, it is desirable to fuse the polyamide by using temperatures above the melting point of the polyamide. This technique is more fully disclosed and claimed in copending application of William J. Davis, Serial No. 753,189, executed August 1, 1958, filed August 5, 1958, entitled, Fused Filled Nylon and assigned to the assignee of the present application.

By applying the above outlined sintering techniques to the formation of nylon articles, articles are formed which are of a density substantially the same as that of nylon material which has been melted and solidified under pressure in a mold.

I have found that by the performance of a special preheating treatment on finely divided powder nylon of a size suitable for sintering, a powder composition results which is capable of formation by cold pressing and sintering into nylon articles having a relatively high degree of porosity, for example from about 15% to about 40%. By "porosity" is meant the ratio of the volume of the pores in a given article to the total volume of the article, that is the proportion of the total volume which is occupied by pores.

The heat treatment of the invention is effected by raising the temperature of the nylon powder to a point at least as high as about 250° F. When substantially pure nylon powder is used, or when nylon powder having only a small proportion of filler, for example up to about 10 or 20% by volume, is used, the upper limit of the temperature range involved is a couple of degrees below the melting point of the polyamide. However, when highly filled nylon, for example having as much as 55% by volume of filler, is used the upper limit of the temperature range is somewhat higher, even as high as about 50° F. above the melting point of the polyamide.

In any case, the period of time during which the polyamide must be held at the elevated temperature varies depending on the temperature involved. In general, it can be said that the higher the temperature, the shorter the interval of time. For temperatures toward the lower end of the range, that is about 250° F., a period of time of the order of about one-half hour is necessary. However, when temperatures toward the upper limits are employed, the interval of time through which the material must be held at the elevated temperature reduces almost to the vanishing point. In other words, when the more elevated temperatures are employed, the powder need only be raised to the temperature in question and then cooled.

The heat treatment of the invention must be carried out on the nylon powder under non-oxidizing conditions. This can be effected by heating in a vacuum or in a non-oxidizing gas. It can also be effected by heating in air when a suitable quantity of an alkali metal silicate has been incorporated according to the technique more fully disclosed and claimed in co-pending application of Richard Gilles, Serial No. 753,211, filed August 1, 1958, executed August 5, 1958, and entitled, Polyamide Oxidation Inhibiting Processes and Resulting Products, and assigned to the assignee of the present application. As is more fully disclosed in that application, the addition of an alkali metal silicate makes it possible to sinter in air without encountering any significant degree of oxidation.

After the heating above described, the nylon powder is cooled, cold pressed into a desired shape, and sintered under non-oxidizing conditions.

Special precautions must be taken during the sintering in order to avoid oxidation and also to guard against a disintegration of the shaped green article. Because of the susceptibility of nylon to oxidation at elevated temperatures, the sintering is done under non-oxidizing conditions. Sintering in vacuum is satisfactory as is sintering in a non-oxidizing gas, such as nitrogen or carbon dioxde.

Because vacuum and gas sintering give rise to special handling problems and necessitate special equipment, etc., it has become common practice, when handling ordinary nylon powders, to sinter by immersing the cold pressed article in an oil bath.

However, attempts to oil sinter green articles cold pressed from nylon powder heat treated according to my invention have not been successful. The oil wets the cold pressed particles and apparently loosens the bonds between particles which were effected by the cold pressing. The result is that the article simply disintegrates in the sintering oil bath. I have found that liquid baths, such as molten metal, etc. which do not wet the polamide particles are satisfactory for sintering.

Furthermore, a suitable non-oxidizing sintering action can be effected by incorporating a small quantity of an alkali metal silicate in the polyamide according to the above-mentioned application of Richard Gilles.

Stated generally, the sintering step according to the invention must be carried out under non-oxidizing conditions such that the article retains its cold pressed shape during the sintering, it being understood that this phrase includes vacuum sintering, sintering in a non-oxidizing gas, sintering in a liquid bath which does not wet the polyamide, and sintering in air provided that the article incorporates a suitable proportion of an alkali metal silicate.

The reasons why the heat treatment of the invention makes possible the formation of porous nylon articles are not fully known. However, the following theory may be the explanation.

Extremely finely divided nylon of an ultimate particle size ranging from a few microns up to about 40 microns does not ordinarily remain in the form of individual separate particles. Instead, groups of particles cling together in the form of agglomerates of irregular size and shape. When such agglomerates are cold pressed (as with prior cold pressing and sintering techniques) the minute spaces between the particles of an agglomerate and the minute spaces between agglomerates are substantially entirely filled in. The resultant article is quite dense.

I believe that the heat treatment technique of my invention may harden or strengthen the agglomerates without disturbing the minute spaces or pores therein. When such agglomerates are cold pressed, the minute spaces within each agglomerate and between agglomerates are not entirely filled in, even though high compacting pressures are employed, of the order of magnitude involved in a sintering operation to form an ordinary dense article.

Whatever the reasons may be, suffice it to say that the invention makes possible the formation of strong yet highly porous nylon articles. The following table gives a typical figure for the density of various types of pieces. The figures given hold substantially true for the polyhexamethylene adipamide, polyhexamethylene sebacamide, and polymerized epsilon aminocaproic acid types of nylon. It is assumed that the crystallinity of the nylon of each piece is substantially the same.

| Description of piece: | Density in grams per cc. |
|---|---|
| (a) Molded by cooling molten nylon under pressure | 1.14 |
| (b) Cold pressed and sintered by prior techniques | 1.14 |
| (c) Porous article formed according to the invention | .6 |

Figure 2:
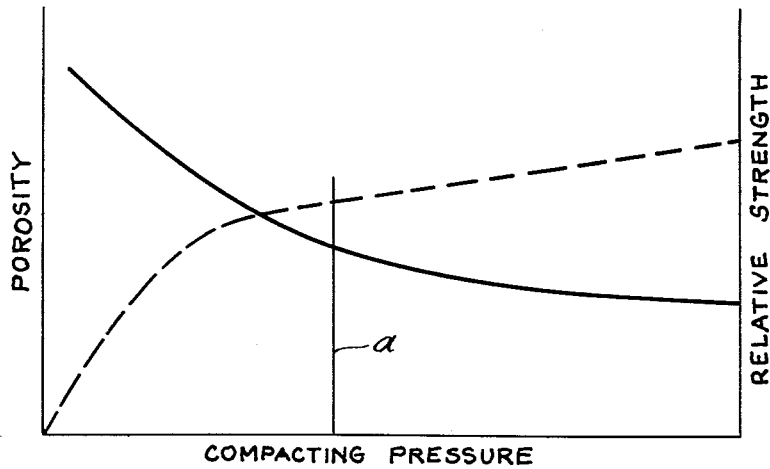

Attention is now turned to the accompanying drawing in which FIGURE 1 is a chart showing typical property curves of a dense article made by prior cold pressing and sintering techniques and FIGURE 2 is a chart similar to FIGURE 1 showing curves of such properties of an article made according to the invention.

As shown in FIGURE 1 the ordinate on the left-hand side represents porosity, the abscissa represents compacting pressure, and the ordinate on the right-hand side represents relative strength. The solid line curve is a plot of porosity against compacting pressure and the dotted curve is a plot of relative strength against compacting pressure. It can be seen from an examination of FIGURE 1 that a compacting pressure sufficient to form an article of reasonably good strength results in a substantial elimination of porosity.

An examination of FIGURE 2, in which the ordinates and abscissa are the same as FIGURE 1, reveals that, by following the technique of the invention, articles of good strength can be produced which nevertheless have a relatively high degree of porosity.

The ordinates of FIGURE 1 and FIGURE 2 are aligned so as to facilitate a direct comparison of the results obtained by various compacting pressures. A compacting pressure such as indicated at *a* in FIGURE 1 yields an article of substantially no porosity and of relatively poor strength. Turning to FIGURE 2, compacting pressure *a* yields an article of quite good strength and of relatively high porosity.

There are a number of ways of easily ascertaining whether or not the heat treatment has been carried out to an extent sufficient according to the invention. When highly filled nylon is used and heat treatment temperatures above the melting point of the nylon are employed, observation of the heat treated powder after cooling will establish whether the required change has taken place. If the change has occurred, the powder becomes considerably more flowable, the comparison in flowability between the untreated powder and the treated powder being similar to the comparison in flowability of talcum powder and salt.

When using unfilled or only slightly filled nylon, it is necessary to cold press and sinter a piece in order to find out whether or not the required change has taken place. If the heating has been effected to a temperature and for a period of time sufficient to materially increase the porosity of the shaped article, the article will have a dull look and slightly rough feel, as compared with ordinary sintered pieces which have a rather shiny look and smooth feel. It is also, of course, possible to tell whether the required change has taken place by measuring the density of the formed piece and comparing the density with that of ordinary nylon.

A number of specific examples of the products and processes of the invention follow:

Example I

Polyhexamethylene adipamide (melting point 507° F.) powder was prepared by precipitation from solution. The powder was heated under non-oxidizing conditions to a temperature of 300° F. and held at that temperature for about one-half hour. The heat treated powder was then cold pressed in a mold under a pressure of 25 tons per square inch. The green article was then sintered in a vacuum and exhibited a porosity of about 15%. The article had good strength.

Example II

The steps of Example I were followed except that the heating temperature was 350° F. and the period of time at that temperature was about twenty minutes. The resulting article exhibited a porosity and strength about same as that of the article of Example I.

Example III

The steps of Example I were again carried out by using a temperature of 400° F. and a time of about fifteen minutes. The same results were achieved.

Example IV

The steps of Example I were again carried out using a temperature of 450° F. and an extremely short period of time. In effect the powder was simply raised to 450° F. and then cooled. The same results were achieved.

Example V

Examples I to IV were repeated with a polyamide composition composed of 60% polyhexamethylene adipamide and 40% polymerized epsilon aminocaproic acid (melting point 425° F.). Substantially the same results were achieved.

Example VI

Examples I to IV were repeated with polymerized epsilon aminocaproic acid polyamide and substantially the same results were achieved.

Example VII

A powder mixture containing about 45% by volume of polymerized epsilon aminocaproic acid and about 55% by volume of calcium carbonate was heat treated at a temperature of 470° F. (45° F. above the melting point of the polyamide). The resulting powder flowed exceptionally freely and, after cold pressing and sintering, yielded an article of good strength and of relatively high porosity.

Example VIII

Polyamide powder composed of about 60% polyhexamethylene adipamide and 40% polymerized epsilon aminocaproic acid was treated according to the steps of Example VII and a roller for a "Charge-plate" type imprinter was formed from the powder. The roller was used in a printing operation. It picked up more than 20% of its weight in ink and exhibited excellent ink retention properties under varying atmospheric conditions. The pores of the roller were measured and were found to be of a diameter generally running between 1 and 5 microns.

Example IX

A material used in Example VIII was formed into a ball bearing retainer and impregnated with oil. The retainer stood up well under tests, exhibiting an exceptionally long life.

What is claimed is:

1. A method of producing a porous article from high melting synthetic linear polyamide comprising, heating the polyamide in finely divided powder form to a temperature of from about 250° F. up to about the melting point, holding the powder at such temperature for a period of time up to about one-half hour, cooling the powder, cold pressing the powder to form a green article capable of being handled, and sintering the green article under non-oxidizing conditions such that the article retains its cold pressed shape to form a strong shaped article having a porosity of from about 15% to about 40%.

2. A method of producing a porous shaped high melting synthetic linear polyamide article which comprises the steps of dissolving the polyamide in a swelling agent for the polyamide at elevated temperatures and a non-swelling agent at room temperature, precipitating the polyamide from solution, freeing the resultant polyamide powder from the swelling agent and drying the polyamide under non-oxidizing conditions, heating the polyamide powder to a temperature of from about 250° F. up to about the melting point, cooling the powder substantially down to room temperature, cold pressing the powder to form a shaped green article, the cold pressing being carried out with sufficient pressure to allow the resulting shaped green article to be handled, and sintering the green article under non-oxidizing conditions such that the article retains its cold pressed shape.

3. A method of making high melting synthetic linear polyamide powder for use in producing porous polyamide shapes comprising, dissolving the polyamide in a swelling agent for the polyamide at elevated temperatures and a non-swelling agent at room temperature, precipitating the polyamide from solution, freeing the resultant polyamide powder from the swelling agent and drying the polyamide under non-oxidizing conditions, heating the polyamide powder to a temperature below its melting point and such that an article subsequently cold pressed and sintered from the powder will have a porosity of from about 15% to about 40% and cooling the powder.

4. A method according to claim 3 in which the polyamide powder is heated to a temperature of from about a few degrees below the melting point to about 250° F., and the powder is held at such temperature, for a period of time up to about one-half hour.

5. A method of producing a porous shaped high melting synthetic linear polyamide article which comprises the steps of dissolving the polyamide in a swelling agent for the polyamide at elevated temperatures and a non-swelling agent at room temperature, precipitating the polyamide from solution, freeing the resultant polyamide powder from the swelling agent and drying the polyamide under non-oxidizing conditions, mixing the polyamide powder with a substantial proportion of an inert filler in particle form, heating the powder mixture to a temperature of from about 250° F. up to a few degrees below the melting point of the polyamide, cooling the powder mixture substantially down to room temperature, cold pressing the powder mixture to form a shaped green article, the cold pressing being carried out with sufficient pressure to allow the resulting shaped green article to be handled, and sintering the shaped green article under non-oxidizing conditions such that the article retains its cold pressed shape, the sintering being effected by heating the article to a temperature sufficiently high to sinter the article but not higher than about 50° F. above the melting point.

6. The shaped porous polyamide article produced by the method of claim 1.

7. A method according to claim 5 in which the powder mixture, prior to the cold pressing, is heated to a temperature in the range of from 250° F. to about 50° F. above the melting point of the polyamide but beneath that temperature at which a fused mass will result.

8. The shaped porous polyamide article produced by the method of claim 7.

References Cited in the file of this patent

UNITED STATES PATENTS

| | | |
|---|---|---|
| 2,400,091 | Alfthan | May 14, 1946 |
| 2,695,425 | Stott | Nov. 30, 1954 |